US010862925B2

(12) United States Patent
Kim et al.

(10) Patent No.: US 10,862,925 B2
(45) Date of Patent: Dec. 8, 2020

(54) APPARATUS AND METHOD FOR PROVIDING REAL-TIME CYBERSECURITY TRAINING IN CONTROL SYSTEM FIELD

(71) Applicant: ELECTRONICS AND TELECOMMUNICATIONS RESEARCH INSTITUTE, Daejeon (KR)

(72) Inventors: Kyeong-Ho Kim, Daejeon (KR); Joonsoo Kim, Cheonan-si (KR); Tae Ghyoon Kim, Daejeon (KR); Moonsu Jang, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 218 days.

(21) Appl. No.: 16/111,934

(22) Filed: Aug. 24, 2018

(65) Prior Publication Data
US 2019/0319985 A1 Oct. 17, 2019

(30) Foreign Application Priority Data
Apr. 13, 2018 (KR) .................. 10-2018-0043352

(51) Int. Cl.
*H04L 29/06* (2006.01)
*G09B 19/00* (2006.01)

(52) U.S. Cl.
CPC .......... *H04L 63/20* (2013.01); *G09B 19/0053* (2013.01)

(58) Field of Classification Search
CPC ...... H04L 63/20; G09B 19/0053; G09B 19/00
See application file for complete search history.

(56) References Cited

U.S. PATENT DOCUMENTS

| 10,075,532 B2* | 9/2018 | Schmidt | H04L 63/0876 |
| 2005/0024225 A1 | 2/2005 | Sokol et al. | |
| 2006/0155738 A1* | 7/2006 | Baldwin | G06Q 10/00 |
| 2012/0258437 A1* | 10/2012 | Sadeh-Koniecpol | G06F 21/564 434/362 |
| 2014/0199663 A1* | 7/2014 | Sadeh-Koniecpol | H04L 63/1458 434/118 |
| 2014/0199664 A1* | 7/2014 | Sadeh-Koniecpol | G06F 21/563 434/118 |

(Continued)

FOREIGN PATENT DOCUMENTS

| KR | 10-1534192 B1 | 7/2015 |
| KR | 10-1709115 B1 | 3/2017 |

*Primary Examiner* — John B King
(74) *Attorney, Agent, or Firm* — LRK Patent Law Firm (57) ABSTRACT

An apparatus and a method for providing real-time cybersecurity training. The apparatus for providing real-time cybersecurity training includes a trainee interface unit for communicating with an access device of a trainee who participates in real-time cybersecurity training for a control system, a virtual environment provision unit for providing a virtual environment that includes at least one of a virtual network environment and a virtual system environment corresponding to the real-time cybersecurity training, and a target facility representation unit for displaying the state of a target facility, which is a physical facility that needs to be protected, and the state of a control device of the control system depending on the real-time cybersecurity training.

14 Claims, 6 Drawing Sheets

(56) References Cited

U.S. PATENT DOCUMENTS

| | | | |
|---|---|---|---|
| 2017/0103674 A1* | 4/2017 | Sadeh-Koniecpol | ........................ H04L 63/1433 |
| 2017/0244746 A1* | 8/2017 | Hawthorn | ............ H04L 63/1408 |
| 2019/0207981 A1* | 7/2019 | Sweeney | .............. H04L 41/0686 |
| 2019/0258953 A1* | 8/2019 | Lang | ....................... G06N 5/025 |
| 2020/0285978 A1* | 9/2020 | Chen | ......................... G06N 3/08 |
| 2020/0314137 A1* | 10/2020 | Tsitkin | ................ H04L 63/1441 |

* cited by examiner

APPARATUS AND METHOD FOR PROVIDING REAL-TIME CYBERSECURITY TRAINING IN CONTROL SYSTEM FIELD

CROSS REFERENCE TO RELATED APPLICATION

This application claims the benefit of Korean Patent Application No. 10-2018-0043352, filed Apr. 13, 2018, which is hereby incorporated by reference in its entirety into this application.

BACKGROUND OF THE INVENTION

1. Technical Field

The present invention relates generally to technology for providing real-time cybersecurity training, and more particularly to technology for providing training for securing capability to respond to cyberthreats that target control systems.

2. Description of the Related Art

Existing cybersecurity-related training provides training for protecting general IT systems. General IT systems indicate various types of devices and services, such as PCs, web servers, DB servers, and the like. Existing cybersecurity-related education or training systems construct a physical or virtual training environment and provide the same. In this case, damage in the provided environment is represented as homepage defacement, service unavailable errors, and the like.

Recently, an increase in the number of cyberthreats to national infrastructure control systems has alerted people to the danger of cyberthreats. Accordingly, training for responding to cyberthreats is required not only in general IT systems but also in areas including physical facilities that need to be protected, such as control systems.

Control systems are representative examples of physical facilities that need to be protected. Unlike general IT systems, control systems control actual physical devices. Accordingly, in the event of a cyber crisis in a control system, the control system fails in control of such physical devices, which may result in significant casualties and financial damage.

However, because actual physical devices are involved, existing cybersecurity education methods are not adequate to conduct efficient training for control systems. Accordingly, methods for providing training for protecting control systems have been developed. As representative examples of such methods, there are a method of providing only a virtual environment, which is similar to a conventional method, a method of providing an actual device, and a method of providing a virtual environment and models.

When only a virtual environment is provided, all targets that need to be protected are configured as virtual ones. Therefore, it is easy to configure the environment, but it is difficult to correctly represent the characteristics of a control device. As a result, it is difficult for trainees to immerse themselves in training. Also, the method of providing an actual device enables training related to the characteristics of a control device, but training is limited to a specific field or a specific device. Therefore, it is difficult to extend training to various fields.

Also, the method of providing a virtual environment and models facilitates the configuration of a training environment and enables training related to the characteristics of a control device, but models must be produced individually for respective fields.

Therefore, it is required to develop a universal method for providing a training environment in various kinds of control system fields by overcoming the limitation of the conventional method of providing a virtual environment and models. In connection with this, Korean Patent No. 10-1709115 discloses a technology related to "Apparatus and method for providing cyber training".

SUMMARY OF THE INVENTION

An object of the present invention is to provide a real-time cybersecurity training environment that is commonly applied in various control system fields.

Another object of the present invention is to improve a trainee's ability to respond to cyberthreats by providing real-time cybersecurity training.

A further object of the present invention is to improve the capability to respond to cyberthreats in a control system field that includes physical facilities that need to be protected.

Yet another object of the present invention is to overcome the limitations of the conventional method of providing a virtual environment and models and to enable cybersecurity training to be conducted in various control system fields.

In order to accomplish the above objects, an apparatus for providing real-time cybersecurity training according to the present invention includes a trainee interface unit for communicating with an access device of a trainee who participates in real-time cybersecurity training for a control system; a virtual environment provision unit for providing a virtual environment that includes at least one of a virtual network environment and a virtual system environment corresponding to the real-time cybersecurity training; and a target facility representation unit for displaying a state of a target facility, which is a physical target that needs to be protected, and a state of a control device of the control system depending on the real-time cybersecurity training.

Here, the target facility representation unit may display the state of the control device for a common control system component using a Programmable Logic Controller (PLC) and an actuator that includes at least one of a magnet switch, a motor, and a relay.

Here, the common control system component may be derived from a result of analysis of a structure and service of the control system applied in at least one of an energy field, a traffic field, and a water resource field, and the control system may be at least one of an electric power control system, a rail control system, a nuclear power control system, a water decontamination control system, a road control system, and an aviation control system.

Here, the target facility representation unit may include a control device representation module for displaying the state of the control device of the control system using the common control system component and a target facility representation module for representing the target facility using a structure in which a base and a model are combined.

Here, the base of the target facility representation module may be in a form of a matrix that includes multiple cells.

Here, a module installed in the base may include at least one of an LED module and a manipulation module.

Here, a state of the module installed in the base may be changed depending on a training situation when the real-time cybersecurity training is conducted.

Here, the LED module may emit different color of light depending on a type of the model combined with the module and the training situation.

Here, the control device representation module may include different types of PLCs that operate depending on the real-time cybersecurity training.

Here, the virtual environment provision unit may provide the virtual environment that includes at least one control system component among a Human-Machine Interface (HMI), an engineering workstation, a historian DB, a Patch Management System (PMS), and a Personal Computer (PC).

Here, the control system component may be derived from a result of analysis of the structure and service of the control system applied in at least one of an energy field, a traffic field, and a water resource field, and the control system may be at least one of an electric power control system, a rail control system, a nuclear power control system, a water decontamination control system, a road control system, and an aviation control system.

Here, the target facility representation unit for representing a training situation in real time depending on the real-time cybersecurity training may display the state of the control device for the common control system component depending on a control state of the component of the virtual environment provision unit.

Here, the access device of the trainee may access the apparatus that provides the real-time cybersecurity training using at least one remote service, among a remote desktop and virtual network computing (VNC).

Here, the access device of the trainee may access the apparatus that provides the real-time cybersecurity training using an access tool provided by a virtualization solution.

Also, a method for providing real-time cybersecurity training performed by an apparatus for providing real-time cybersecurity training according to an embodiment of the present invention includes providing a virtual environment that includes at least one of a virtual network environment and a virtual system environment corresponding to real-time cybersecurity training for a control system; receiving information about a response from an access device of a trainee who participates in the real-time cybersecurity training; and displaying a state of a target facility, which is a physical target that needs to be protected, and a state of a control device of the control system depending on the real-time cybersecurity training.

Here, displaying the states may be configured to display the state of the control device for a common control system component using a Programmable Logic Controller (PLC) and an actuator that includes at least one of a magnet switch, a motor, and a relay.

Here, displaying the states may be configured to display the state in at least one of a control device representation module, which displays the state of the control device of the control system using the common control system component, and a target facility representation module, which represents the target facility using a structure in which a base and a model are combined.

Here, the base of the target facility representation module may be in a form of a matrix that includes multiple cells, and a module installed in the base may include at least one of an LED module and a manipulation module.

Here, providing the virtual environment may be configured to provide the virtual environment that includes at least one control system component among a Human-Machine Interface (HMI), an engineering workstation, a historian DB, a Patch Management System (PMS), and a Personal Computer (PC).

Here, displaying the states may be configured to display the state of the control device for the common control system component depending on a control state of the control system component and to thereby display a training situation in real time depending on the real-time cybersecurity training.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Because the present invention may be variously changed and may have various embodiments, specific embodiments will be described in detail below with reference to the attached drawings.

However, it should be understood that those embodiments are not intended to limit the present invention to specific disclosure forms and that they include all changes, equivalents or modifications included in the spirit and scope of the present invention.

The terms used in the present specification are merely used to describe specific embodiments, and are not intended to limit the present invention. A singular expression includes a plural expression unless a description to the contrary is specifically pointed out in context. In the present specification, it should be understood that terms such as "include" or "have" are merely intended to indicate that features, numbers, steps, operations, components, parts, or combinations thereof are present, and are not intended to exclude the possibility that one or more other features, numbers, steps, operations, components, parts, or combinations thereof will be present or added.

Unless differently defined, all terms used here including technical or scientific terms have the same meanings as terms generally understood by those skilled in the art to which the present invention pertains. Terms identical to those defined in generally used dictionaries should be interpreted as having meanings identical to contextual meanings of the related art, and are not to be interpreted as having ideal or excessively formal meanings unless they are definitively defined in the present specification.

Embodiments of the present invention will be described in detail with reference to the accompanying drawings. In the following description of the present invention, the same reference numerals are used to designate the same or similar elements throughout the drawings, and repeated descriptions of the same components will be omitted.

Figure 1:
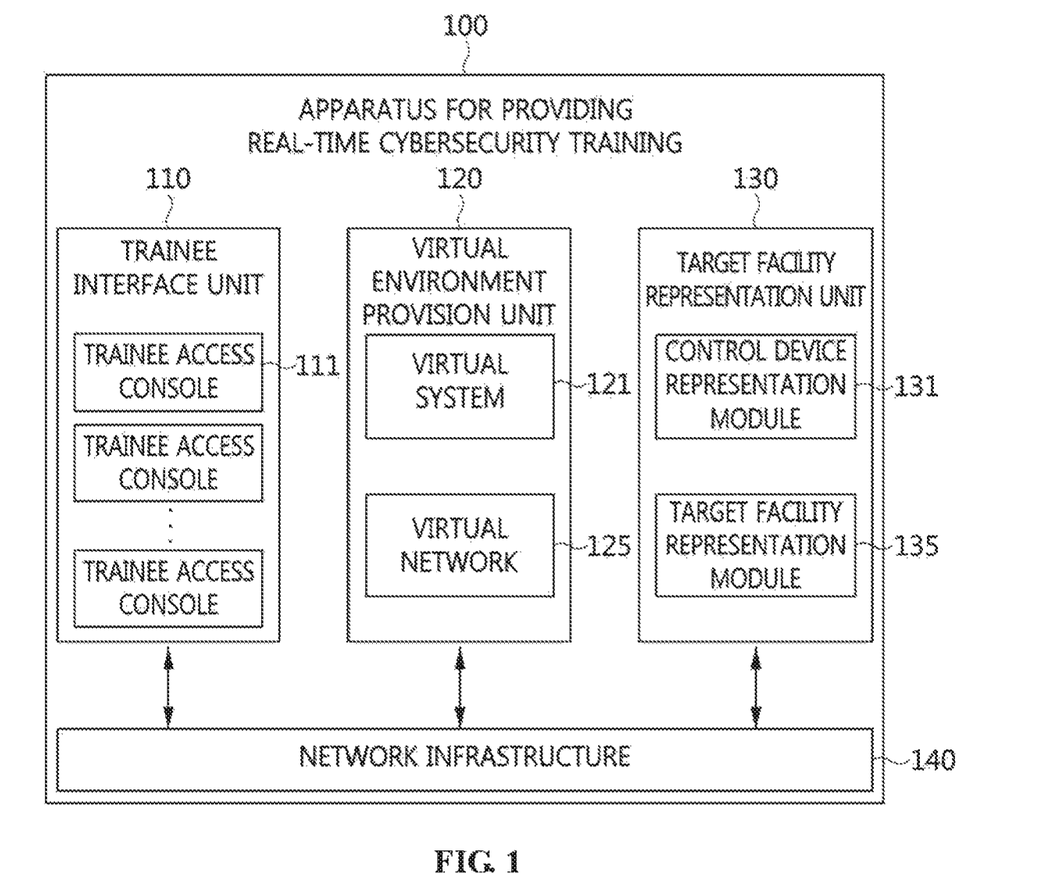
FIG. 1 is a block diagram that shows the configuration of an apparatus for providing real-time cybersecurity training according to an embodiment of the present invention.

FIG. 1 is a block diagram that shows the configuration of an apparatus for providing real-time cybersecurity training according to an embodiment of the present invention.

As illustrated in FIG. 1, an apparatus 100 for providing real-time cybersecurity training may include a trainee interface unit 110, a virtual environment provision unit 120, and a target facility representation unit 130, and may share a training situation through network infrastructure 140.

First, the trainee interface unit 110 communicates with a trainee access console 111, which is a device accessed by a trainee who participates in real-time cybersecurity training for a control system. Here, the trainee access console 111 may be a general IT system, and may use an access tool provided by a virtualization solution or a remote service, such as a Windows remote desktop, Virtual Network Computing (VNC), or the like, in order to access the apparatus 100 for providing real-time cybersecurity training.

When the trainee access console 111 uses a remote service, such as a Windows remote desktop, VNC, or the like, for access to the apparatus 100, the environment may be easily configured. However, when there is a firewall, information about the trainee access console 111 may be included in packets for training or a system log.

On the other hand, a tool provided by a virtualization solution may be applied even when a firewall exists, but there may be functional limitations depending on the level of the provided tool.

The virtual environment provision unit 120 may provide a virtual environment that includes at least one of a virtual system environment 121 and a virtual network environment for real-time cybersecurity training. Particularly, the virtual environment provision unit 120 may provide a virtual network environment, including at least one of a layer 2 (L2) switch, an L3 switch, and the like, provide a virtual system environment, including at least one of a server, a PC, and the like, and provide a training environment, including at least one of an Operating System (OS), a real-time cybersecurity service, and the like.

The virtual environment provision unit 120 may provide a virtual environment that includes at least one control system component among a Human-Machine Interface (HMI), an Engineering Workstation (EWS), a historian DB, a Patch Management System (PMS), and a Personal Computer (PC).

Here, the control system components are merely an embodiment acquired by analyzing control systems in various fields, and may be differently configured by adding another component thereto or deleting one therefrom.

Generally, a control system has a different structure and configuration depending on the field in which the control system is used, the time at which the control system is installed, the manufacturer of the control system, or the like. Accordingly, in order to conduct cybersecurity training for a control system in a new field or a control system of a different manufacturer, it is necessary to newly construct a training environment therefor.

However, the apparatus 100 for providing real-time cybersecurity training according to an embodiment of the present invention may configure a universal control system model by analyzing the structures and services of control systems in various fields, and may display the state of the control device of a control system based on the configured model.

The target facility representation unit 130 displays the state of a target facility, which is a physical target that needs to be protected, and the state of the control device of the control system depending on real-time cybersecurity training.

Here, the target facility representation unit 130 uses a Programmable Logic Controller (PLC) and an actuator in order to display the state of the control device for the common control system components. Here, the actuator may be a magnet switch, a motor, a relay, or the like, but the type of actuator is not limited to these examples.

Here, the PLC is the core of an automation facility and is a control device that controls a physical device by receiving values from various types of sensors. The PLC operates based on the logic embedded therein. Also, a magnet switch, a motor, a relay, or the like is a device for actual physical operation, and is an actuator used for control systems.

The common control system components are merely an embodiment acquired by analyzing control systems in various fields, and may be differently configured by adding another component thereto or deleting one therefrom.

The target facility representation unit 130 may include a control device representation module 131, which displays the state of the control device of the control system using the common control system components, and a target facility representation module 135, which represents the target facility using a structure in which a base and a module are combined.

The target facility representation unit 130 may represent a training situation in real time depending on the real-time cybersecurity training, and may display the state of the control device for the common control system components depending on the control state of the control system components of the virtual environment provision unit 120.

As described above, the apparatus 100 for providing real-time cybersecurity training according to an embodiment of the present invention may provide a virtual environment for conducting real-time cybersecurity training for a universal control system through the virtual environment provision unit 120, and may provide a physical environment that is similar to an actual environment through the target facility representation unit 130.

Hereinafter, a method for providing real-time cybersecurity training performed by the apparatus 100 for providing real-time cybersecurity training according to an embodiment of the present invention will be described in more detail with reference to FIG. 2 and FIG. 3.

Figure 2:
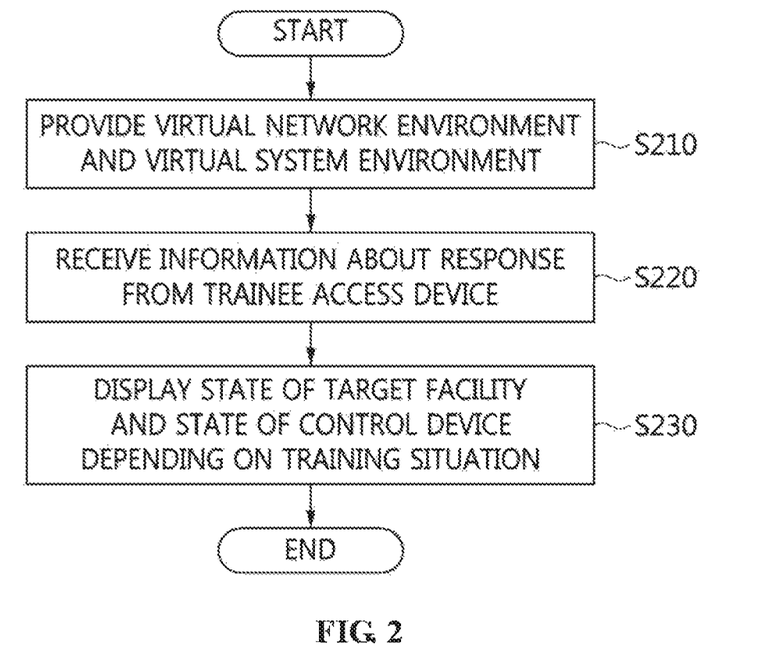
FIG. 2 is a flowchart for explaining a method for providing real-time cybersecurity training according to an embodiment of the present invention.

FIG. 2 is a flowchart for explaining a method for providing real-time cybersecurity training according to an embodiment of the present invention.

First, the apparatus 100 for providing real-time cybersecurity training provides a virtual network environment and a virtual system environment at step S210.

The apparatus 100 for providing real-time cybersecurity training may provide the virtual network environment and the virtual system environment for the real-time cybersecurity training to one or more trainee access devices.

The apparatus 100 for providing real-time cybersecurity training analyzes control system networks and service environments in various fields, such as an energy field, a traffic field, a water resource field, and the like, and thereby provides an environment derived therefrom. Here, the control system may be an electric power control system, a rail control system, a nuclear power control system, a water decontamination control system, a road control system, an aviation control system, or the like, but the type of control system is not limited to these examples.

Here, the derived universal control system environment may include at least one control system component among a Human-Machine Interface (HMI), an Engineering Workstation (EWS), a historian DB, a Patch Management System (PMS), and a PC.

Here, the control system components are acquired by analyzing control systems in various fields. The above-mentioned control system components are merely an embodiment, and may be differently configured by adding another component thereto or deleting one therefrom.

Figure 3:
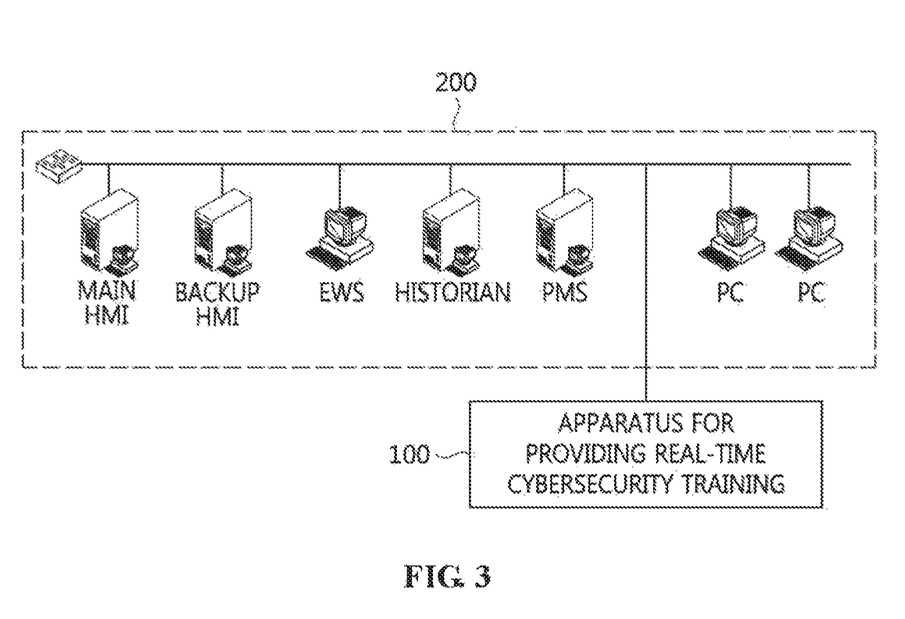
FIG. 3 is an exemplary view that shows control system components according to an embodiment of the present invention.

FIG. 3 is an exemplary view that shows control system components according to an embodiment of the present invention.

As illustrated in FIG. 3, the apparatus 100 for providing real-time cybersecurity training may provide a virtual environment that includes at least one of a main HMI, a backup HMI, an EWS, a historian DB, a PMS, and a PC.

In FIG. 3, the control network area 200 is illustrated as including a main HMI, a backup HMI, an EWS, a historian DB, a PMS, and PCs, but without limitation thereto, the control system components included in the control network area 200 may be variously changed and implemented according to need.

Referring again to FIG. 2, the apparatus 100 for providing real-time cybersecurity training receives response information from the trainee access device at step S220.

The apparatus 100 for providing real-time cybersecurity training may receive information about the response to the real-time cybersecurity training from the trainee access device that conducts the real-time cybersecurity training. Here, the information about the response may be created when the trainee detects a cyberattack or reacts quickly thereto.

Finally, the apparatus 100 for providing real-time cybersecurity training displays the state of the target facility and the state of the control device depending on the training situation at step S230.

The apparatus 100 for providing real-time cybersecurity training may create information about the training situation based on at least one of the virtual network environment corresponding to the real-time cybersecurity training, the virtual system environment corresponding thereto, and the response information received from the trainee access device.

Then, the apparatus 100 for providing real-time cybersecurity training may display the state of the target facility and the state of the control device depending on the training situation based on at least one of the created training situation information, information about the state of the target facility, which is a physical target that needs to be protected, and information about the state of the control device of the control system.

Hereinafter, a method in which the apparatus 100 for providing real-time cybersecurity training displays the state of a target facility and the state of a control device depending on a training situation will be described in more detail with reference to FIG. 4 and FIG. 5.

Figure 4:
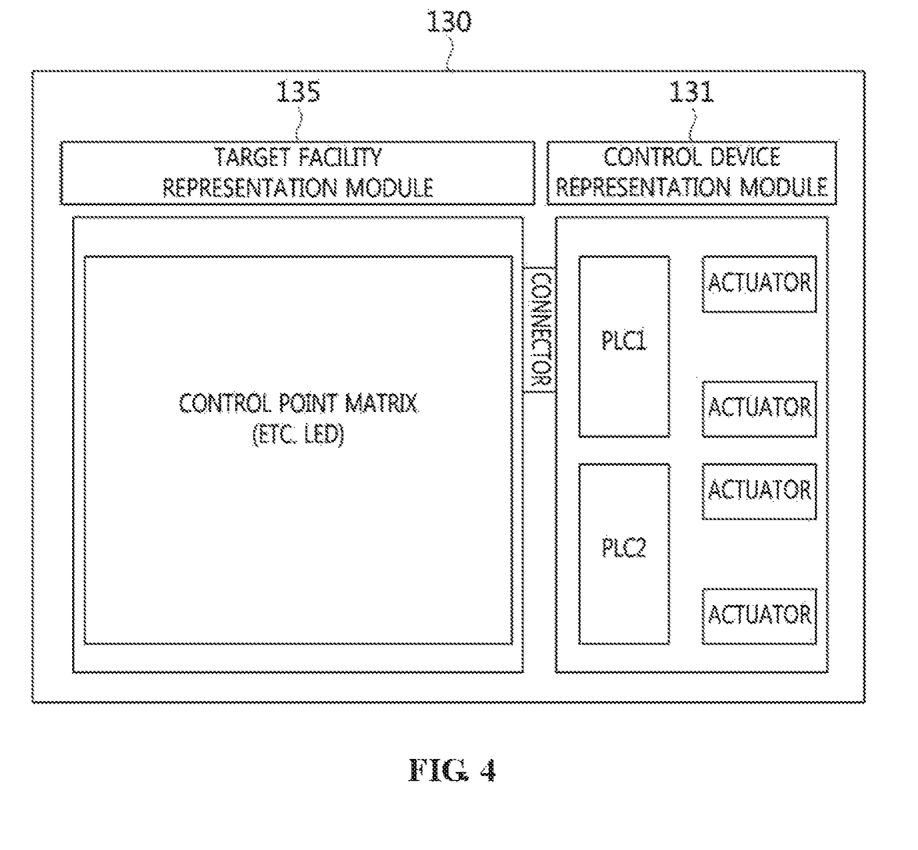
FIG. 4 is a view that shows the structure of a target facility representation unit according to an embodiment of the present invention.

FIG. 4 is a view that shows the structure of a target facility representation unit according to an embodiment of the present invention.

The apparatus 100 for providing real-time cybersecurity training may display the state of a target facility and the state of a control device depending on a training situation through the target facility representation unit 130, as shown in FIG. 4.

The existing security training methods may be largely categorized into the method of providing only a virtual environment, the method of providing an actual device, and the method of providing a virtual environment and models. The method of providing a virtual environment and models represents a training situation using a model of a target facility, an LED module for representing the state of the target facility, and the like. The method of providing a virtual environment and models according to a conventional art may improve immersion in training, but there is a limitation in that it is required to construct a new environment based on the field in which a corresponding control system is included.

In order to overcome this limitation, the apparatus 100 for providing real-time cybersecurity training according to an embodiment of the present invention extracts common control system components by analyzing control systems in various fields, thereby displaying the state of the control device for the common control system components using the target facility representation unit 130.

Here, the target facility representation unit 130 may be divided into a control device representation module 131 and a target facility representation module 135. The control device representation module 131 implements the common control system components with devices that are actually used, thereby improving the sense of realism and accurately simulating the actual characteristics thereof.

Also, the control device representation module 131 displays the state of the control device for the common control system components in order to enable cybersecurity training for control systems in various fields, thereby improving versatility. Also, the control device representation module 131 installs heterogenous PLCs (PLC1 and PLC2), thereby facilitating conversion and securing the flexibility of cybersecurity training.

The target facility representation module 135 may be implemented as a structure in which a base and a model are combined in order to secure the flexibility and efficiency of the apparatus 100 for providing real-time cybersecurity training and to improve the versatility thereof.

Figure 5:
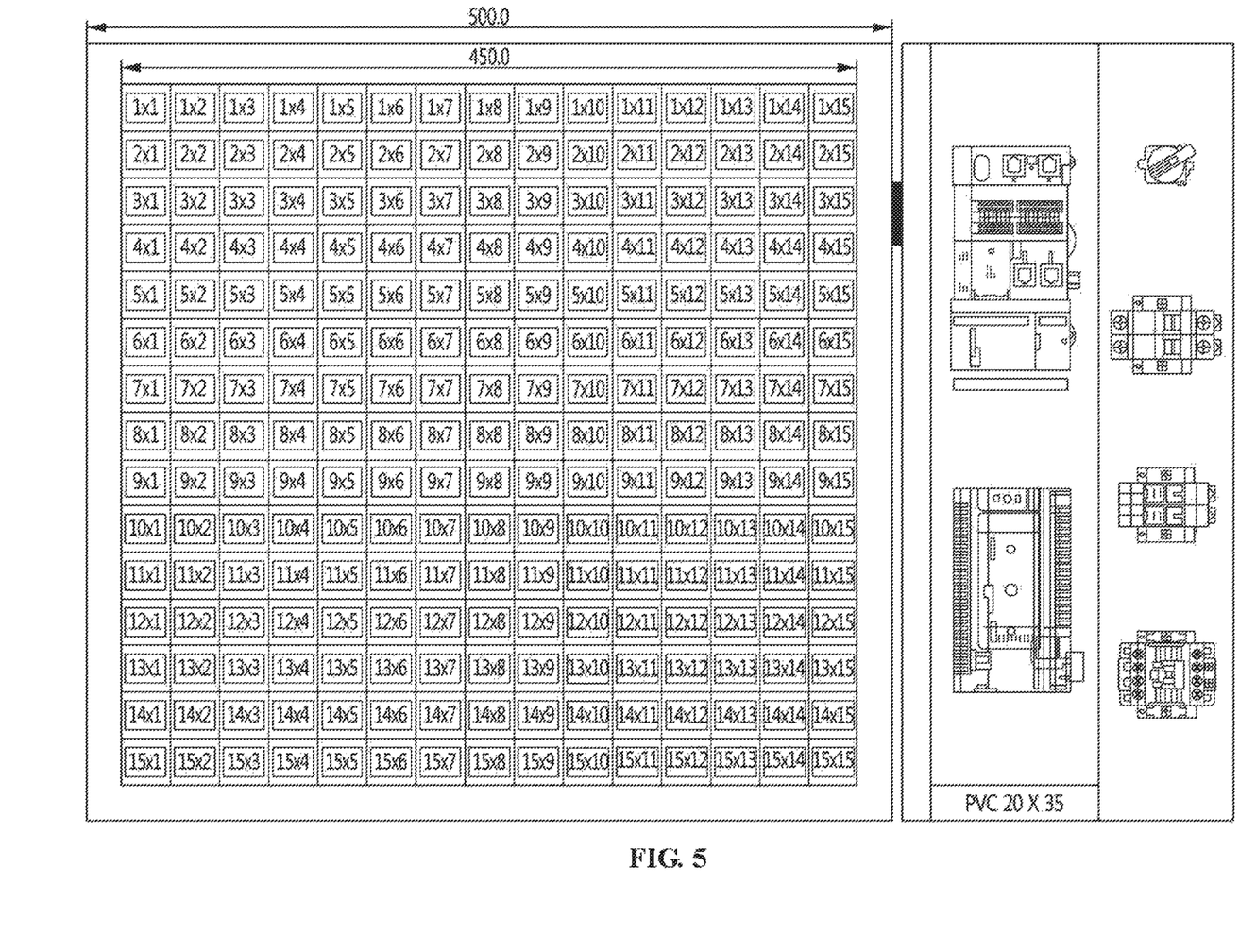
FIG. 5 is an exemplary view that shows an example of a target facility representation unit according to an embodiment of the present invention.

FIG. 5 is an exemplary view that shows an example of a target facility representation unit according to an embodiment of the present invention.

As illustrated in FIG. 5, the base of the target facility representation module 135 may be in the form of a matrix that includes multiple cells. For example, the base may be configured as a 15×15 matrix including cells, each of which is 3 cm×3 cm, and a module may be installed in the cell in the base.

Here, the module installed in the cell may include at least one of an LED module and a manipulation module, or may be variously changed and implemented depending on the shape and function thereof. The cell in which the module is installed may control the state of an LED by supplying electricity thereto, or may acquire an analog value from the module. The state of the module installed in the cell may be changed depending on the training situation while the real-time cybersecurity training is being conducted.

Also, a model may be combined with the module installed in the cell, and may be implemented in various forms, such as a control facility model, a shopping center model, a house model, an apartment model, a road model, and the like.

FIG. 5 shows an embodiment configured based on the common control system components and the structure of a control system, but the shape and arrangement of the target facility representation module 135 is not limited thereto.

The target facility representation unit 130 and the virtual environment provision unit 120 may be connected with each other via a network, and the training situation of cybersecurity training may be reflected in real time and provided to trainee access devices.

Depending on the control state of the HMI of the virtual environment provision unit 120, the operations of the PLC and the actuator of the target facility representation unit 130 may be represented in the target facility representation unit 130, and the state of the module installed in the base of the target facility representation module 135 may be changed depending on the cybersecurity training situation.

For example, assuming that an electric power supply control system is the target of cybersecurity training, an LED module corresponding to a house model and an LED module corresponding to a transformer may emit white light in a normal state.

However, when a control device malfunctions due to a cyber crisis and when the facility is attacked, the LED module corresponding to the house model may be turned off so as to represent a blackout, and the LED module corresponding to the transformer may emit red light in order to represent a failure or explosion.

Figure 6:
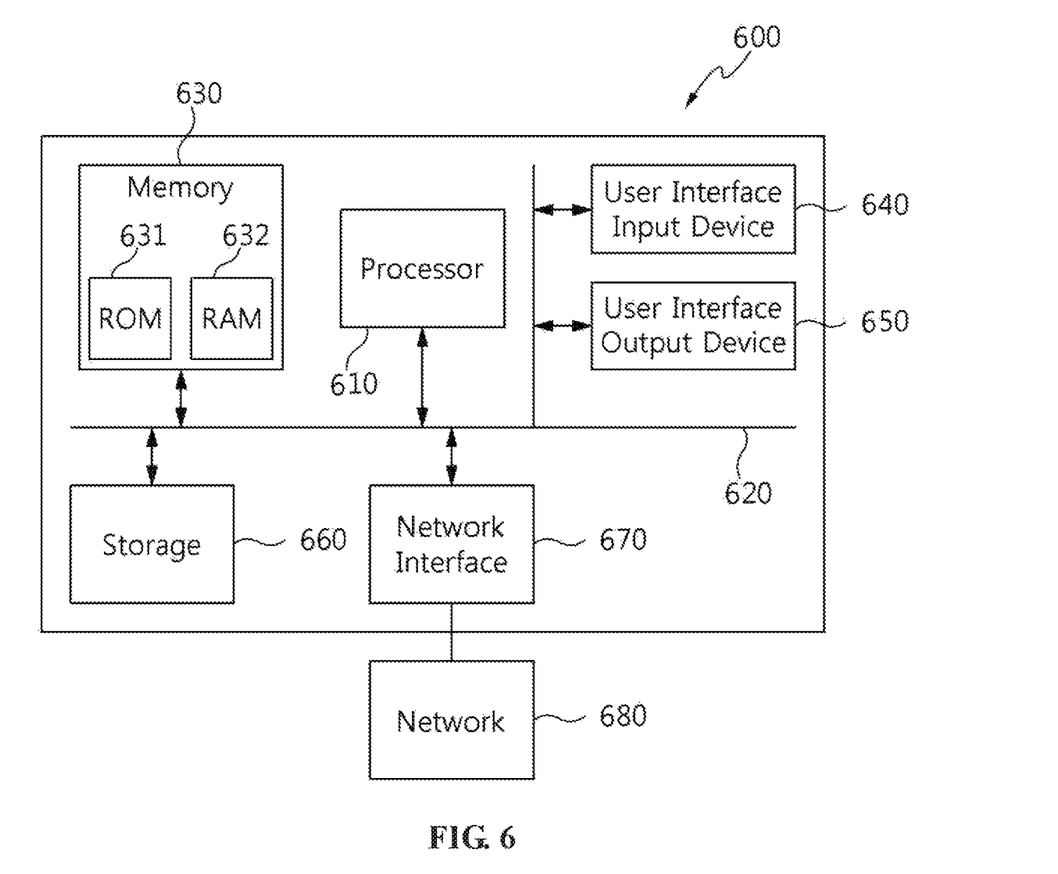
FIG. 6 is a block diagram that shows a computer system according to an embodiment of the present invention.

FIG. 6 is a block diagram that shows a computer system according to an embodiment of the present invention.

Referring to FIG. 6, the embodiment of the present invention may be implemented in a computer system 600 including a computer-readable recording medium. As illustrated in FIG. 6, the computer system 600 may include at least one processor 610, memory 630, a user-interface input device 640, a user-interface output device 650, and storage 660, which communicate with each other via a bus 620. Also, the computer system 600 may further include a network interface 670 connected with a network 680. The processor 610 may be a central processing unit or a semiconductor device for executing processing instructions stored in the memory 630 or the storage 660. The memory 630 and the storage 660 may be various types of volatile or nonvolatile storage media. For example, the memory may include ROM 631 or RAM 632.

Accordingly, an embodiment of the present invention may be implemented as a nonvolatile computer-readable storage medium in which methods implemented using a computer or instructions executable in a computer are recorded. When the computer-readable instructions are executed by a processor, the computer-readable instructions may perform a method according to at least one aspect of the present invention.

According to the present invention, a real-time cybersecurity training environment that is commonly applied in various control system fields may be provided.

Also, according to the present invention, a trainee's ability to respond to cyberthreats may be improved by providing real-time cybersecurity training.

Also, according to the present invention, it is possible to improve the capability to respond to cyberthreats in a control system field that includes physical facilities that need to be protected.

Also, according to the present invention, the limitation of the conventional method of providing a virtual environment and models may be overcome, and cybersecurity training may be conducted in various control system fields.

As described above, the apparatus and method for providing real-time cybersecurity training according to the present invention are not limitedly applied to the configurations and operations of the above-described embodiments, but all or some of the embodiments may be selectively combined and configured, so that the embodiments may be modified in various ways.

What is claimed is:

1. An apparatus for providing real-time cybersecurity training, comprising:
   a server comprising one or more units which are executed by a processor which is connected to a memory, the one or more units comprising:
   a trainee interface unit for communicating with an access device of a trainee who participates in real-time cybersecurity training in a control system field;
   a virtual environment provision unit for providing a virtual environment that includes at least one of a virtual network environment and a virtual system environment corresponding to the real-time cybersecurity training; and
   a target facility representation unit for displaying a state of a target facility, which is a physical target that needs to be protected, and a state of a control device of the control system depending on the real-time cybersecurity training,
   wherein the target facility representation unit comprises:
   a control device representation unit for displaying the state of the control device of the control system using the common control system component; and
   a target facility representation unit for representing the target facility using a structure in which a base and a model are combined,
   wherein the real-time cybersecurity training is displayed on the model, and
   wherein the base of the target facility representation module is in a form of a matrix that includes multiple cells.

2. The apparatus of claim 1, wherein at least one of a common control system component and a control system component corresponding to the control system is derived from a result of analysis of a structure and service of the control system pertaining to at least one of an energy field, a traffic field, and a water resource field.

3. The apparatus of claim 2, wherein the virtual environment provision unit provides the virtual environment that includes at least one of a Human-Machine Interface (HMI), an engineering workstation, a historian DB, a Patch Management System (PMS), and a Personal Computer (PC), corresponding to the derived control system component.

4. The apparatus of claim 1, wherein the target facility representation unit shows the state of the control device for the common control system component using a Programmable Logic Controller (PLC) and an actuator that includes at least one of a magnet switch, a motor, and a relay.

5. The apparatus of claim 1, wherein a module installed in the base includes at least one of an LED module and a manipulation module.

6. The apparatus of claim 5, wherein a state of the module installed in the base is changed depending on a training situation when the real-time cybersecurity training is conducted.

7. The apparatus of claim 2, wherein the access device of the trainee accesses the apparatus that provides the real-time cybersecurity training using at least one of an access tool provided by a virtualization solution and a remote access tool.

8. A method for providing real-time cybersecurity training, which is performed by an apparatus with a server and at least one processor for providing real-time cybersecurity training, comprising the steps of:
   providing a virtual environment that includes at least one of a virtual network environment and a virtual system environment corresponding to real-time cybersecurity training for a control system;

receiving information about a response from an access device of a trainee who participates in the real-time cybersecurity training; and displaying a state of a target facility, which is a physical target that needs to be protected, and a state of a control device of the control system depending on the real-time cybersecurity training, wherein displaying the states is configured to display the state of the target facility and the state of the control device using at least one of a control device representation module, which shows the state of the control device of the control system using the common control system component, and a target facility representation module, which represents the target facility using a structure in which a base and a model are combined, wherein the real-time cybersecurity training is displayed on the model, and wherein the base of the target facility representation module is in a form of a matrix that includes multiple cells.

9. The method of claim 8, further comprising:

setting at least one of a common control system component and a control system component corresponding to the control system by analyzing a structure and service of the control system pertaining to at least one of an energy field, a traffic field, and a water resource field.

10. The method of claim 9, wherein providing the virtual environment is configured to provide the virtual environment that includes at least one of a Human-Machine Interface (HMI), an engineering workstation, a historian DB, a Patch Management System (PMS), and a Personal Computer (PC), corresponding to the set control system component.

11. The method of claim 8, wherein displaying the states is configured to display the state of the control device for the common control system component using a Programmable Logic Controller (PLC) and an actuator that includes at least one of a magnet switch, a motor, and a relay.

12. The method of claim 8, wherein a module installed in the base includes at least one of an LED module and a manipulation module.

13. The method of claim 12, wherein displaying the states is configured to display the states by changing a state of the module installed in the base depending on a training situation when the real-time cybersecurity training is conducted.

14. The method of claim 9, wherein providing the virtual environment is configured to provide the virtual environment to an access device of a trainee that accesses the apparatus, which provides the real-time cybersecurity training, using at least one of an access tool provided by a virtualization solution and a remote access tool.

* * * * *